United States Patent [19]

Lemons, Sr.

[11] 4,384,425
[45] May 24, 1983

[54] FISHING ROD BITE SIGNAL

[76] Inventor: John B. Lemons, Sr., P.O. Box 5360, Stockton, Calif. 95205

[21] Appl. No.: 205,239

[22] Filed: Nov. 10, 1980

[51] Int. Cl.³ .................. A01K 97/12; G08B 7/06
[52] U.S. Cl. ............................ 43/17; 43/17.5; 340/668
[58] Field of Search .................. 43/17, 17.5, 25; 340/573, 668; 362/120, 431, 802

[56] References Cited

U.S. PATENT DOCUMENTS

| | | | |
|---|---|---|---|
| 2,549,694 | 4/1951 | Leyda | 43/17 |
| 2,574,333 | 11/1951 | Kuczynski | 43/17 |
| 2,643,371 | 6/1953 | Sleeger | 362/802 |
| 2,814,900 | 12/1957 | Frazier | 43/17 |
| 3,063,185 | 11/1962 | Dinger | 43/17 |
| 3,600,836 | 8/1971 | Miyamae | 43/17 |
| 3,959,910 | 6/1976 | Montgomery | 43/17 |
| 4,178,712 | 12/1979 | Williams | 43/17 |
| 4,266,217 | 5/1981 | Kao | 43/17 |
| 4,276,711 | 7/1981 | Mathauser | 43/17 |

Primary Examiner—Nicholas P. Godici
Assistant Examiner—Charles L. Willis
Attorney, Agent, or Firm—Harvey B. Jacobson

[57] ABSTRACT

A signal device associated with a fishing rod and fishing line mounted thereon to automatically indicate to a fisherman that a fish has taken the bait by providing both a visual signal and audible signal. The fishing rod bite signal includes a light and buzzer connected to a battery or batteries through a switch mechanism having an actuator engaged with the fishing line. The switch actuator includes a resilient body having a longitudinal recess therein for frictional engagement with the fishing line so that the fishing line can be engaged with the switch actuator at any point along its length and the switch actuator will release the line when the fishing line reel is actuated to reel in the line and also release the line in the event of outward tension being exerted on the line beyond a predetermined tension so that the fish which has taken the bait can, in some instances, pull the line outwardly and unreel it from the fishing reel. The signal device includes an adjustment feature to enable the sensitivity thereof to be varied so that the signal device can be adapted for use under various fishing conditions and to compensate for drag on the fishing line which may occur when fishing in rather swift water or trolling.

2 Claims, 5 Drawing Figures

U.S. Patent May 24, 1983 4,384,425
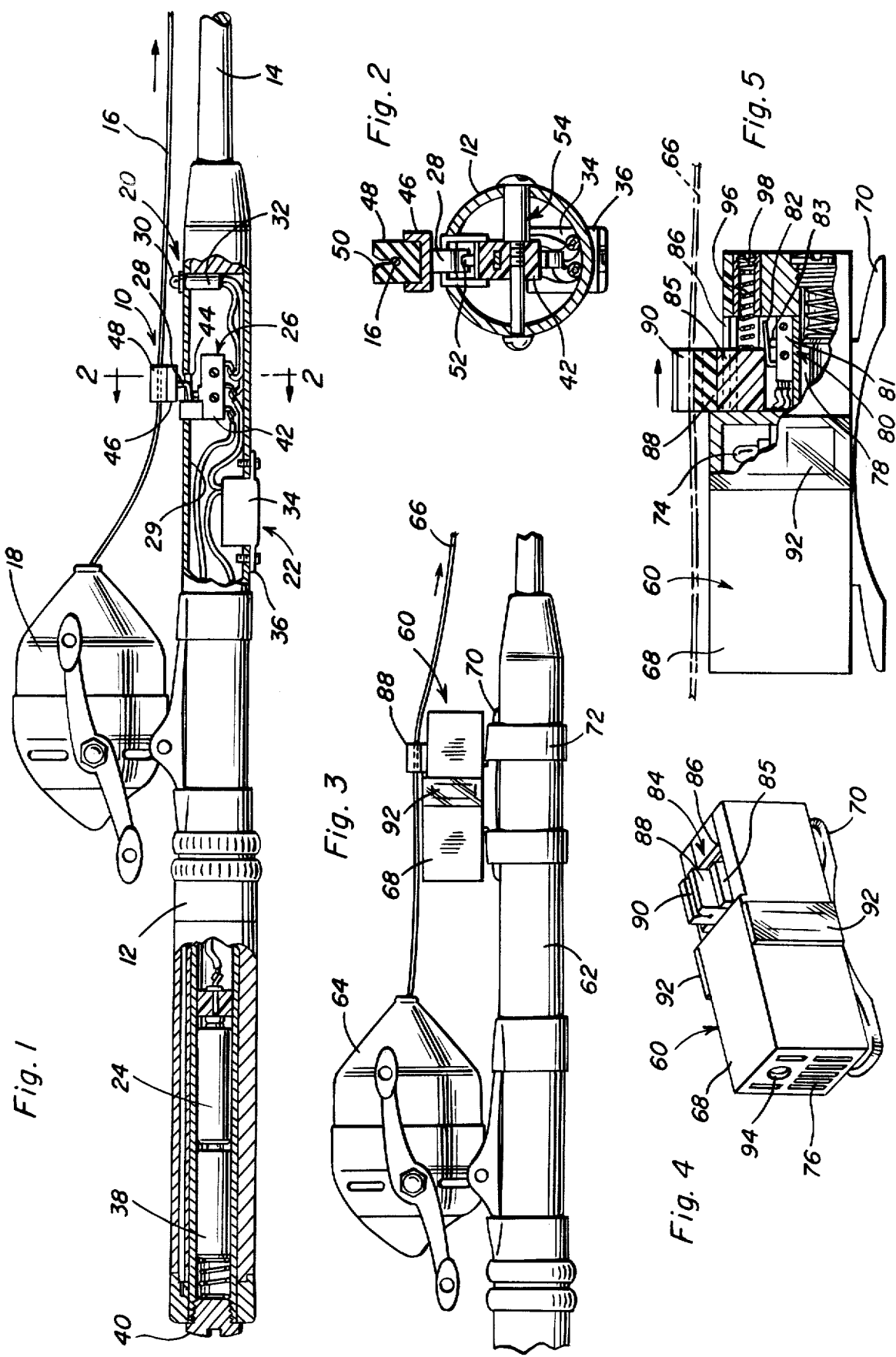

FISHING ROD BITE SIGNAL

FIELD OF THE INVENTION

The present invention generally relates to a fishing rod bite signal indicating tension being exerted on a fishing line such as when a fish takes the bait by providing both audible and visual signals having a source of energy in the form of a replaceable battery or batteries and a switch mechanism having an actuator frictionally and releasably gripping the fishing line to sense the movement thereof and actuate the switch mechanism to cause the signals to function with one embodiment being incorporated into the fishing rod handle and another embodiment being self-contained and attachable to the fishing rod without modification thereof.

SUMMARY OF THE INVENTION

An object of the present invention is to provide a fishing rod bite signal having a light and buzzer connected to a battery assembly through a switch mechanism having an actuator frictionally engaged with the fishing line to sense longitudinal movement of the fishing line such as when a fish takes the bait thereby actuating the light and buzzer and warning the fisherman that a fish has taken the bait or that he has a bite.

A further object of the present invention is to provide a fishing rod bite signal in accordance with the preceding object in which the fishing rod includes a hollow handle with the components of the bite signal being incorporated therein except for the fishing line gripping arrangement on the end of the switch actuator which projects outwardly from the fishing rod handle and includes a resilient body having a groove formed therein for frictionally and releasably gripping the fishing line to enable the line to be automatically released therefrom when the reel is actuated to reel in the line or released therefrom when a predetermined outward tension is exerted on the fishing line such as when the fish tries to pull the line outwardly from the reel.

A further object of the present invention is to provide a fishing rod bite signal in accordance with the preceding objects in which the components of the signal device are self-contained in a housing which is mountable exteriorly of a conventional fishing rod handle without modification thereof with the fishing line gripping arrangement on the switch actuator being the same as in that embodiment which is built into the fishing rod handle.

Still another object of the invention is to provide a fishing rod bite signal which is provided with an adjustment feature to enable the sensitivity of the device to be varied by varying the force required to actuate the switch thereby enabling the signal device to be used under varying fishing conditions such as when fishing in swift water or when trolling.

Yet another important object of the present invention is to provide a fishing rod bite signal which is simple in construction, easy to install into a fishing rod handle or attached to a fishing rod handle, easy to associate with the fishing line and relatively inexpensive to manufacture while still being dependable and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the fishing rod bite signal of the present invention incorporated into a hollow handle fishing rod with portions broken away illustrating the association of the components thereof.

FIG. 2 is a transverse, sectional view taken substantially upon a plane passing along section line 2—2 of FIG. 1 illustrating the structural features thereof.

FIG. 3 is a side elevational view of the embodiment of the invention in which the signal is self-contained in a housing.

FIG. 4 is a perspective view of the self-contained signal illustrated in FIG. 3.

FIG. 5 is a side elevational view of the structure of FIG. 4 with portions thereof broken away illustrating the adjustment feature for the switch actuator sensitivity.

DESCRIPTION OF THE PREFERRED EMBODIMENTS

Referring now specifically to FIGS. 1 and 2, the fishing rod bite signal of the present invention is generally designated by numeral 10 and is mounted in the hollow handle 12 of a fishing rod 14 having a conventional fishing line 16 mounted thereon which is connected with a reel mechanism 18 which may be either a spinning-type reel as illustrated or a levelwind reel. The signal device 10 includes a light assembly 20, a buzzer assembly 22, a battery assembly 24 and a switch 26 having a switch actuator 28 connected thereto. All of the aforementioned components are incorporated into the hollow interior 30 of the hollow handle 12 with the light assembly 20 including a light bulb or bulbs 30 supported in a base 32 which is disposed within the housing with the bulb exposed. Likewise, the buzzer assembly 22 includes a housing 34 with mounting tabs 36 securing it in an aperture in the tubular handle 12 so that the sound emitted can be easily heard. The battery assembly 24 includes at least one and preferably two conventional dry cell batteries 38 mounted in the end of the tubular handle 12 and being retained in place by a removable cap or closure 40 and provided with the usual conductors and contacts associated therewith in a conventional manner to supply electrical energy to the buzzer assembly 22 and light assembly 20 through the switch 26 which is also mounted in the interior of the handle 12 with the switch 26 being a microswitch 42 of conventional construction and having an actuating arm 28 extending through an opening 44 which may be provided with a suitable seal for retaining the components waterproof. The switch actuator or arm 28 includes a channel-shaped member 46 on the end thereof on which is fixedly mounted a body of resilient material 48 such as plastic, rubber or the like having a longitudinal groove 50 formed in the upper surface thereof for frictionally gripping and receiving the fishing line 16 therethrough. The gripping member 48 is located generally in alignment with the fishing line 16 adjacent to where it enters the reel 18 so that the line 16 can be easily placed in the groove 50 by merely pushing the fishing line downwardly into the groove 50. The fishing line, when moved outwardly, will move the gripping member 48 outwardly and thus cause the arm 28 to flex downwardly to depress or actuate the microswitch button 52. The arm 28 will be constructed of metal such as spring steel or the like and by initially bending the arm 28, the sensitivity of the signalling device can be varied by requiring more or less force to be exerted on the fishing line 16 to actuate the microswitch 42. When it is desired to reel in the line, the line 16 will automatically release itself from the gripping member 48 and when the fish exerts an excessive pull on the line, it will release itself from the gripping member 48 so that the line tension control on the reel 18 can operate in the normal manner. The adjustment of the sensitivity of the device enables the signalling device to be adjusted for use in various fishing conditions such as when in swift running water or when trolling. FIG. 2 illustrates a mounting structure for the microswitch 42 which is in the form of a transverse screw-threaded structure generally designated by the numeral 54 with it being pointed out that any suitable means may be provided for supporting the various components within the hollow fishing rod handle 12 with various epoxy glues or the like also being usable to render the device waterproof as desired.

Referring now specifically to FIGS. 3-5, a second embodiment of the fishing rod bite signal of the present invention is illustrated and generally designated by the numeral 60 which is a self-contained unit attached to the exterior surface of a conventional fishing rod handle 62 in alignment with the fishing line reel 64 and in alignment with the fishing line 66 which extends from the reel 64 in a conventional manner. In this embodiment of the invention, the fishing rod bite signal 60 includes a generally rectangular housing 68 having a pair of downwardly and outwardly flared attaching flanges 70 on the bottom surface thereof by which the housing may be secured to the handle 62 by retaining straps or bands 72 in a conventional manner.

The bite signal 60 includes the same basic components as the bite signal 10 including a light 74, a buzzer 76, a battery 78, a switch assembly 80, and a switch actuator 84 which is in the form of a slidable member 85 mounted through an undercut longitudinal slot or groove 86 in the top wall of the housing 68 and provided with a resilient body 88 on the upper end thereof of the same construction as the gripping member 48 with the gripping member or resilient body 88 also including a groove 90 therein for frictionally engaging the fishing line 66 in exactly the same manner as the gripping member 48 engages the line 16 in FIGS. 1 and 2 so that the line may be easily attached to the switch actuator 84 and released therefrom in the event of actuation of the reel 64 to wind the line 66 onto the reel 64 or in the event of the line 66 being pulled outwardly by the fish thus enabling the tension control on the reel to operate in the conventional manner when playing the fish. The switch assembly 80 includes a microswitch 81 with arm 82 and button 83 comparable to arm 28 and button 52 in FIGS. 1 and 2.

The light assembly 74 is disposed centrally in the housing 68 and the opposite sides of the housing have transparent window members 92 therein covering a transverse passageway in which the light 74 is mounted so that when the light 74 is energized, the illumination provided will be observable through the transparent windows 92 which may be colored any suitable color such as red or the like to render the light more visible when energized. The buzzer 76 is of conventional construction and is located behind a grill or other apertures to enable the sound to emit therefrom which is the same as the structure in FIGS. 1 and 2 with the buzzer itself being of conventional construction and an aperture 94 is provided in the end wall 44 and also in the buzzer housing 34 to enable access to a screw threaded adjustment of the buzzer tone in a conventional and well known manner. The buzzer is a commercially available item and the structure in and of itself does not form any part of this invention except for its association with the other components and its combination with the other components. Likewise, the light bulb, base and the electrical circuitry to the battery, buzzer, light and switch are all conventional in and of themselves.

In the embodiment illustrated in FIGS. 4 and 5, the sensitivity of the signal is adjusted by a compression spring 96 extending between the slidable member 85 and an adjustable screw-threaded plug 98 accessible from exteriorly of the housing 68 so that the plug 96 can be rotated and screwed inwardly or outwardly to vary the compression of the spring 96 thereby varying the sensitivity of movement of the slidable switch actuator 84 thus compensating for tension forces normally exerted on the fishing line under various fishing conditions such as when fishing in swift running water or the like.

The two embodiments of the invention enable the bite signal of the present invention to be attached to conventional or existing fishing rods without any modification whatsoever by using the arrangement illustrated in FIGS. 3-5 or incorporated as a built-in unit in fishing rods having a hollow handle structure as illustrated in FIGS. 1 and 2 with both embodiments having the identical structure for engaging the fishing line and each of the embodiments responding to a tension force being exerted on the fishing line such as when a fish strikes or takes the bait to close a microswitch and operate the light which is in the form of a visual signal and a buzzer which is in the form of an audible signal thus directing the fisherman's attention to the fact that the bait has been taken by a fish. This device also enables those having visual impairment or hearing impairment to more effectively fish by providing both a visual and audible signal device.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing rod bite signal comprising a battery assembly, a light assembly, a buzzer assembly, a switch assembly and a switch actuator assembled to actuate the light assembly and buzzer assembly when the switch actuator is moved in a predetermined manner, means supporting said assemblies with the switch actuator disposed adjacent to and in alignment with a fishing line connected with the fishing rod, said switch actuator including a resilient body having a longitudinal groove therein for frictionally receiving and engaging the fishing line to enable the switch actuator to be moved when the line is tensioned and moved outwardly and releasing the line therefrom when the frictional engagement therewith has been overcome such as when reeling in the fishing line or a fish pulling outwardly on the line with a predetermined force thereby enabling a line tension control on a fishing reel on the fishing rod to be utilized in a conventional manner when fishing, said components being incorporated into a self-contained housing, means mounting the housing exteriorly of a fishing rod with the resilient body underlying the fishing line, said switch actuator including a slide mechanism mounted in the housing for longitudinal movement with the resilient gripping body on the exterior thereof disposed outwardly of the housing and movable linearly and longitudinally of the housing, and means adjustably spring biasing the slide mechanism to vary the sensitivity of the fishing rod bite signal, said body being constructed of plastic material and said longitudinal groove closely underlying the fishing line whereby the line may be inserted into the groove by exerting downward finger pressure thereon whereby the initial longitudinal movement of the line will move the body and actuate the light assembly and buzzer assembly, said slide mechanism including a slide member longitudinally slidable in an undercut groove in said housing, said body being mounted on the slide member and extending above the housing, said means biasing the slide mechanism including a compression coil spring mounted in said housing with one end engaging said slide member, the other end of said spring engaging a screw threaded plug in an exterior wall of the housing to enable adjustment of the spring.

2. The structure as defined in claim 1 wherein said switch assembly includes a microswitch disposed in said housing below the slide member, said microswitch including a reciprocal plunger extending upwardly therefrom, a pivotal arm connected to the microswitch and having a free end portion overlying and engaging the plunger with the upper surface of the arm being engaged by the slide member when moved horizontally to actuate the microswitch.

* * * * *